United States Patent
Hosoda et al.

(10) Patent No.: US 10,910,931 B2
(45) Date of Patent: Feb. 2, 2021

(54) METHOD OF MANUFACTURING DIVIDED CORES FOR A STATOR

(71) Applicant: HONDA MOTOR CO., LTD., Tokyo (JP)

(72) Inventors: Yuichi Hosoda, Tochigi-ken (JP); Ryosuke Fukuchi, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 255 days.

(21) Appl. No.: 16/029,717

(22) Filed: Jul. 9, 2018

(65) Prior Publication Data

US 2019/0020251 A1 Jan. 17, 2019

(30) Foreign Application Priority Data

Jul. 14, 2017 (JP) .................................. 2017-137764

(51) Int. Cl.
*H02K 15/095* (2006.01)
*H02K 3/18* (2006.01)
*H02K 15/02* (2006.01)
*H02K 15/10* (2006.01)
*H02K 3/32* (2006.01)
*H02K 3/52* (2006.01)
(Continued)

(52) U.S. Cl.
CPC ............. *H02K 15/095* (2013.01); *H02K 3/18* (2013.01); *H02K 3/30* (2013.01); *H02K 3/325* (2013.01); *H02K 3/522* (2013.01); *H02K 15/022* (2013.01); *H02K 15/105* (2013.01); *H02K 1/148* (2013.01); *H02K 2203/12* (2013.01)

(58) Field of Classification Search
CPC .. H02K 15/022; H02K 15/095; H02K 15/105; H02K 1/148; H02K 2203/12
See application file for complete search history.

(56) References Cited

U.S. PATENT DOCUMENTS 4,182,026 A * 1/1980 Searle .................... H02K 1/148
29/596
7,536,770 B2 * 5/2009 Yamazaki ............ H02K 15/095
242/432.1
(Continued)

FOREIGN PATENT DOCUMENTS

| JP | 54-093449 | 7/1979 |
|---|---|---|
| JP | 2002-315249 | 10/2002 |

(Continued)

OTHER PUBLICATIONS

Japanese Office Action for Japanese Patent Application No. 2017-137764 dated May 28, 2019.

*Primary Examiner* — Minh N Trinh
(74) *Attorney, Agent, or Firm* — Amin, Turocy & Watson, LLP

(57) ABSTRACT

An electromagnetic coil is formed by winding a wire around a winding member of an insulator. The winding member is configured with a substantially polygonal shape. Further, in a winding step of winding the wire, which is supplied from a wire supply unit, around the winding member, when the wire reaches a corner portion of the winding member, a residual stress toward an outer side in the diametrical direction of the stator is imparted to the wire. Thereafter, portions of the insulative coating of the wire are subjected to fusion bonding.

7 Claims, 6 Drawing Sheets

(51) Int. Cl.
    *H02K 3/30*    (2006.01)
    *H02K 1/14*    (2006.01)

(56) References Cited

U.S. PATENT DOCUMENTS

| | | | | |
|---|---|---|---|---|
| 8,847,457 | B2* | 9/2014 | Yoshida | H02K 3/522 |
| | | | | 29/596 |
| 8,875,381 | B2* | 11/2014 | Uchiumi | H02K 15/0081 |
| | | | | 29/596 |
| 2008/0129142 | A1* | 6/2008 | Sheeran | H02K 1/148 |
| | | | | 310/216.009 |
| 2011/0047780 | A1* | 3/2011 | Akita | H02K 15/022 |
| | | | | 29/527.1 |
| 2013/0200742 | A1* | 8/2013 | Seki | H02K 1/148 |
| | | | | 310/195 |
| 2019/0020251 | A1* | 1/2019 | Hosoda | H02K 3/522 |

FOREIGN PATENT DOCUMENTS

| JP | 2008-148406 | 6/2008 |
|---|---|---|
| JP | 2009-099908 | 5/2009 |

* cited by examiner

METHOD OF MANUFACTURING DIVIDED CORES FOR A STATOR

CROSS-REFERENCE TO RELATED APPLICATION

This application is based upon and claims the benefit of priority from Japanese Patent Application No. 2017-137764 filed on Jul. 14, 2017, the contents of which are incorporated herein by reference.

BACKGROUND OF THE INVENTION

Field of the Invention

The present invention relates to a method of manufacturing divided cores for a stator in order to obtain a stator that constitutes part of a motor.

Description of the Related Art

As is well known, a motor includes an annular stator containing an electromagnetic coil, and a rotor in which permanent magnets are retained and which rotates in a circumferential direction of the stator. In this instance, for example, the stator is constituted by combining a plurality of divided cores for the stator, which are obtained by covering the divided cores with insulators, and winding a band-shaped wire (also referred to as a "flat wire") around the insulators.

A winding member of the insulator around which the wire is wound has a substantially rectangular shape. As described in Japanese Laid-Open Patent Publication No. 2008-148406, a wire which is supplied from a nozzle is wound around such a winding member. The wire, for example, is wound from an outer diametrical side toward an inner diametrical side of the winding member when constructing the stator, and when the wire reaches an innermost diametrical side of the winding member, thereafter, the wire is wound from the inner diametrical side toward the outer diametrical side. At this time, a wire layer, which is wound subsequently from the inner diametrical side toward the outer diametrical side, is laminated onto a wire layer, which is previously wound from the outer diametrical side toward the inner diametrical side. Stated otherwise, an electromagnetic coil is formed by laminating a plurality of wire layers.

An insulative coating is formed on the wire. After winding has been performed in the manner described above, the electromagnetic coil is heated to thereby soften the insulative coating, and thereafter, the electromagnetic coil is cooled to thereby harden the softened insulative coating. Along with such hardening, portions of the insulative coating are bonded to each other. In other words, fusion bonding is carried out.

SUMMARY OF THE INVENTION

The electromagnetic coil is held at a position (initial position) at which it was wound by frictional forces acting between the wire layers. In other words, a state of alignment is maintained. On the other hand, when the insulative coating is softened when fusion bonding is carried out, the frictional force decreases, and the electromagnetic coil moves slightly while being directed toward a diametrical inward direction of the stator. In other words, the state of alignment is disturbed. Upon the occurrence of such movement, a predetermined clearance is formed between the electromagnetic coils themselves, in a manner so that the electromagnetic coil does not contact the electromagnetic coil of another adjacent divided core.

Stated otherwise, concerning the dimension in the circumferential direction of the stator (the circumferential length of the annulus), it is necessary that the dimension includes the clearances formed between the adjacent divided cores. Therefore, the stator must be constructed as a large-sized stator.

If the wire is wound at a low speed, the amount of movement of the electromagnetic coil in the diametrical inward direction of the stator can be reduced. However, in this case, the winding efficiency of the wire, and hence the production efficiency of the stator or the motor, is lowered.

In the forgoing manner, in the method of manufacturing the divided cores for a stator according to the conventional technique, there is an inconvenience in that it is difficult to improve winding efficiency of the wire while at the same time reducing the size of the stator.

A principal object of the present invention is to provide a method of manufacturing divided cores for a stator which enables the size of the stator to be reduced.

Another object of the present invention is to provide a method of manufacturing divided cores for a stator, which can avoid a decrease in the winding efficiency of a wire.

According to an embodiment of the present invention, there is provided a method of manufacturing a divided core for a stator, wherein a coil is provided by winding a wire around iron cores through an insulator to thereby obtain the divided core for a stator;

wherein a winding member, which is of a substantially polygonal shape and on which the wire is wound, is used as the insulator;

the method comprising:

a winding step in which, when winding the wire, which is supplied from a wire supply unit, around a corner portion of the winding member, a residual stress toward an outer side in the diametrical direction of the stator is imparted to the wire; and a fusion bonding step of fusion bonding an insulative coating of the wire.

According to the conventional technique, when the wire is wound around a corner portion, a residual stress is not imparted intentionally to the wire. In contrast thereto, according to the present invention, when the wire is wound around the corner portion, an arbitrary residual stress in a diametrical outward direction of the stator is intentionally imparted. The diametrical outward direction is determined when the divided cores are assembled forming the stator. Therefore, when the insulative coating is softened in the fusion bonding step, the wire moves toward the diametrical outward direction of the stator.

More specifically, according to the present invention, when the fusion bonding step is carried out, it is possible to prevent the wire from moving in a diametrical inward direction of the stator during the fusion bonding step, and as a result, it is possible to avoid contact between the electromagnetic coils (resulting in short circuiting). Accordingly, there is no need to provide a clearance between the adjacent electromagnetic coils on an inner side in the diametrical direction of the stator for taking into account the amount of movement of the wire.

For this reason, the clearance can be made as small as possible, and by this amount, it is possible to minimize the circumferential length of the stator. Stated otherwise, it is possible to reduce the size of the stator, as well as the size of a motor that is constructed to include the stator.

Additionally, in this case, there is no need to reduce the winding speed of the wire. Accordingly, since sufficient winding efficiency is ensured, the production efficiency of the divided cores for a stator as well as the stator itself can be maintained.

Teeth portions of the iron cores, around which the wire is wound through the insulator, extend radially along the diametrical direction of the stator. Accordingly, the distance between the adjacent electromagnetic coils increases in the diametrical outward direction of the stator. Therefore, even if the wire moves in the diametrical outward direction of the stator, a clearance between the adjacent electromagnetic coils is secured. More specifically, in the diametrical outward direction of the stator as well, contact between the electromagnetic coils themselves is avoided.

In order to impart the residual stress, it is simply necessary to provide an inclination of a predetermined angle between the wire and the wire supply unit while the wire is being wound around a corner portion of the winding member. For this purpose, for example, the wire supply unit is moved. Along therewith, friction is generated between the wire and the corner portion of the winding member, and as a result, the residual stress is imparted to the wire.

The movement of the wire in the diametrical inward direction of the stator is noticeable when the wire is a belt-shaped flat wire. Accordingly, it is preferable to apply the residual stress with respect to a wire that is made from a flat wire. In this case as well, the wire moves in a diametrical outward direction of the stator. More specifically, it is possible to easily prevent the wire from moving in the diametrical inward direction of the stator.

According to the present invention, when the wire is wound around the winding member of the insulator, and in particular, when the wire reaches the corner portion of the winding member, an arbitrary residual stress in a diametrical outward direction of the stator is intentionally imparted with respect to the wire. Therefore, in the fusion bonding step, the wire moves in the diametrical outward direction of the stator. More specifically, movement of the wire in the diametrical inward direction of the stator is avoided.

Stated otherwise, when the fusion bonding step is performed, it is possible to prevent the electromagnetic coils from coming into contact with each other on the inner side in the diametrical direction of the stator, thereby avoiding the occurrence of short circuiting. Therefore, there is no need to provide a clearance between the adjacent electromagnetic coils on an inner side in the diametrical direction of the stator for taking into account the amount of movement of the wire.

Consequently, the clearance can be made as small as possible, and by this amount, the circumferential length of the stator can be minimized, and the stator, as well as a motor that includes the stator, can be reduced in size.

In addition, since there is no need to reduce the winding speed of the wire, sufficient winding efficiency is ensured, and the production efficiency of the divided cores for the stator as well as the stator itself is maintained.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment in relation to a method of manufacturing divided cores for a stator according to the present invention will be described in detail below with reference to the accompanying drawings. In the description given below, the divided cores for a stator are also referred to simply as divided cores.

Figure 1:
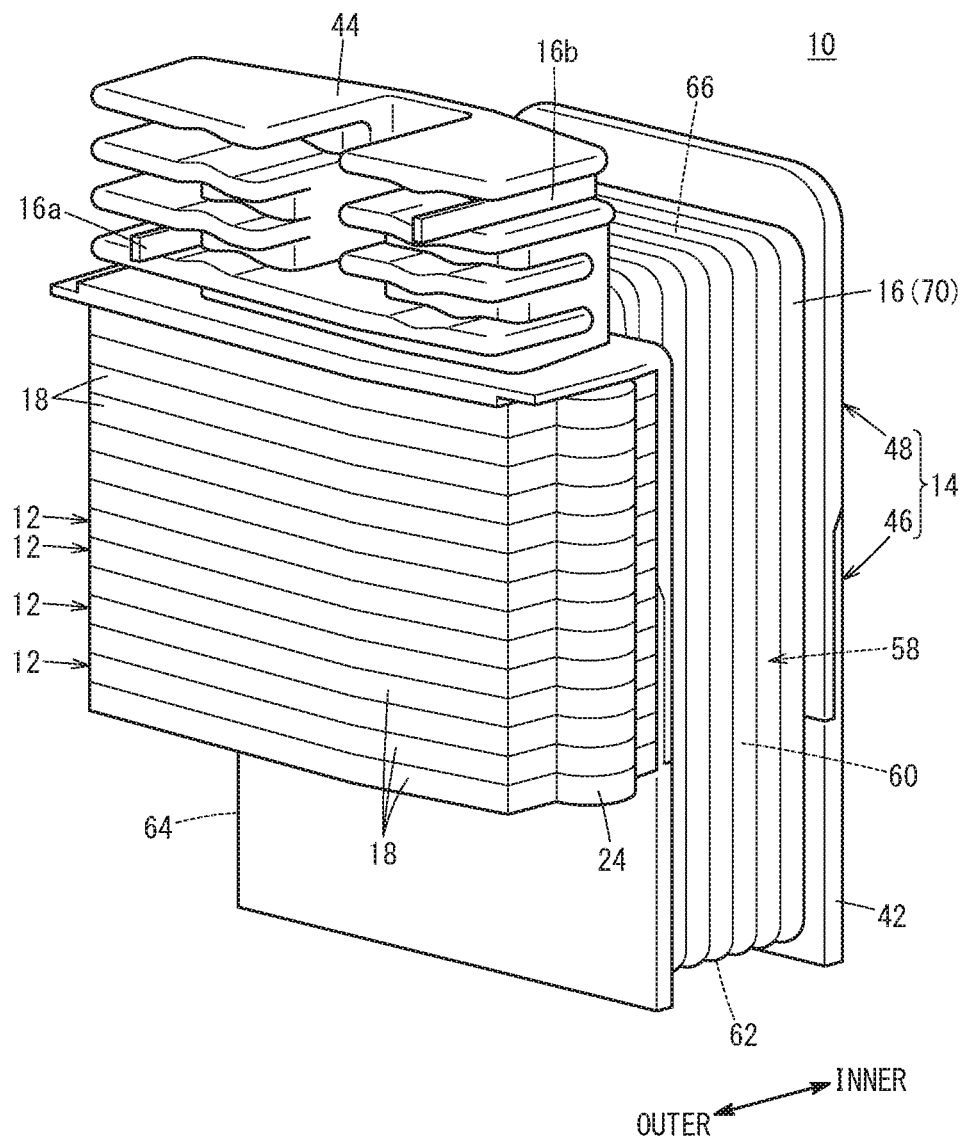
FIG. 1 is a schematic overall perspective view of a divided core that constitutes part of a stator.

First, the divided cores that constitute the stator will be described with reference to FIGS. 1 and 2. Each of the divided cores 10 includes divided iron cores 12 made of substantially T-shaped thin metal plates (steel plates), an insulator 14 covering the divided iron cores 12, and an electromagnetic coil 16 surrounding a portion of the divided iron cores 12 through the insulator 14.

The divided iron cores 12 include yoke portions 18 that extend along the circumferential direction of the stator, and teeth portions 20 that protrude in a diametrical inward direction approximately from a center of the yoke portions 18. A substantially semicircular fitting recess 22 is formed in one end in the circumferential direction of the yoke portions 18, and a substantially semicircular fitting projection 24 capable of being fitted into the fitting recess 22 is formed in another end in the circumferential direction of the yoke portions 18. By fitting the fitting projection 24 of another adjacent divided core 10 into the fitting recess 22, a plurality of the divided cores 10 are connected together in an annular shape to thereby constitute a stator 40 (see FIG. 6).

The teeth portions 20 are placed on an inner circumferential side of the stator 40, and the yoke portions 18 are placed on an outer circumferential side of the stator 40. Accordingly, the teeth portions 20 themselves of the plurality of divided cores 10 are arranged in an annular shape.

The insulator 14 is made from a resin, for example. The insulator 14 includes a coil bobbin 42 around which the electromagnetic coil 16 is wound, and a lead wire accommodating section 44 in which two terminal portions (lead wires) 16a, 16b, which are drawn out from the electromagnetic coil 16, are accommodated. Thereamong, in particular as shown in FIG. 2, the coil bobbin 42 is constituted by fitting a first bobbin component member 46 and a second bobbin component member 48 so as to sandwich the teeth portions 20 mutually therebetween.

The first bobbin component member 46 includes a bottom side base portion 50, and first opposing wall portions 52a, 52*b* that rise up substantially vertically from both ends of the bottom side base portion 50. On the other hand, in addition to the lead wire accommodating section 44, the second bobbin component member 48 includes a ceiling side base portion 54, and second opposing wall portions 56*a*, 56*b* that hang down substantially vertically from both ends of the ceiling side base portion 54. The winding member 58 is formed by superimposing the second opposing wall portions 56*a*, 56*b* on the first opposing wall portions 52*a*, 52*b*.

Figure 2:
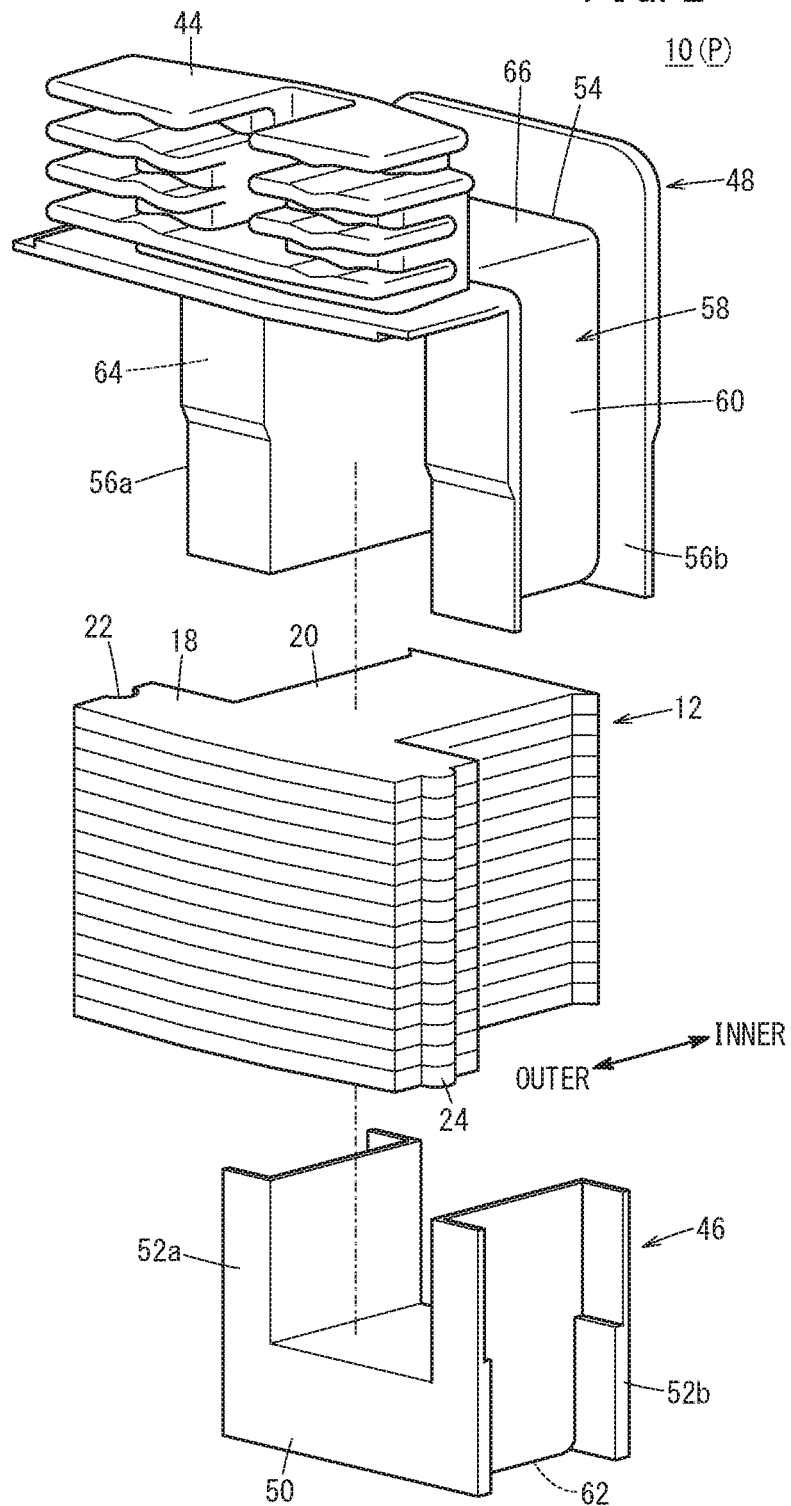
FIG. 2 is a schematic exploded perspective view of the divided core (partially finished product) prior to forming an electromagnetic coil.

As can be appreciated from FIG. 2, the winding member 58 is made up from four surfaces, including the side surface of the second opposing wall portion 56*a*, the bottom surface of the bottom side base portion 50, the side surface of the second opposing wall portion 56*b*, and the upper surface of the ceiling side base portion 54. As will be described later, the respective surfaces consist of a right side surface 60, a back surface 62, a left side surface 64, and a front surface 66, which exhibit a substantially rectangular (substantially quadrilateral) shape. The wire 70 is wound around the winding member 58 to thereby form the electromagnetic coil 16. The shape of the winding member 58 may be polygonal, and is not particularly limited to being of a substantially rectangular shape (substantially quadrilateral shape).

According to the present embodiment, a flat wire is used as the wire 70. The wire 70, which is made up from a flat wire, is first wound from an outer diametrical side toward an inner diametrical side of the stator 40, until the wire 70 reaches an innermost diametrical location. When a first layer has been formed thereby, thereafter, the wire 70 is wound over the first layer, from the inner diametrical side toward the outer diametrical side, until the wire 70 reaches an outermost diametrical location. In this manner, a second layer is formed. Stated otherwise, the second layer is superimposed on the first layer.

Thereafter, winding of the wire 70 is carried out in a similar manner. Accordingly, in odd-numbered layers, the wire 70 is wound from the outer diametrical side toward the inner diametrical side, whereas in even-numbered layers, the wire 70 is wound from the inner diametrical side toward the outer diametrical side.

An insulative coating is applied to the wire 70. The insulative coating of the first layer is fusion bonded to the winding member 58 (the bottom side base portion 50, the second opposing wall portion 56*a*, the ceiling side base portion 54, and the second opposing wall portion 56*b*). On the other hand, the insulative coatings of respective layers are fusion bonded to one another mutually. Consequently, the electromagnetic coil 16 is fixed to the winding member 58, together with the layers from the first layer to the last layer being fixed together in an integral manner.

Figure 3:
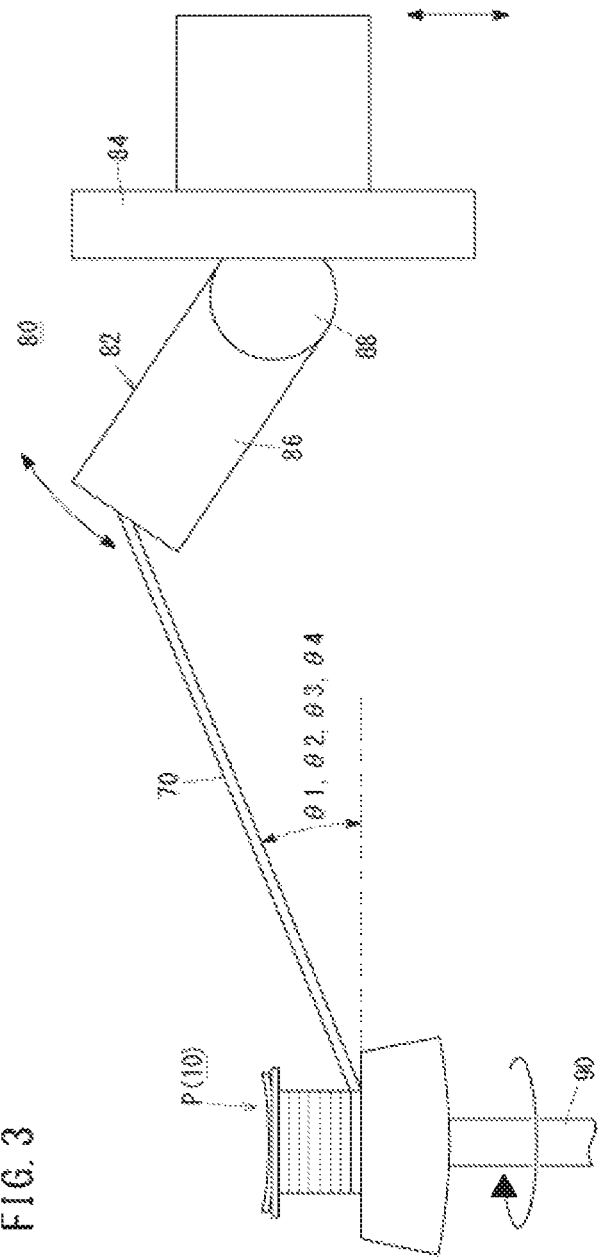
FIG. 3 is a configuration explanatory diagram in which there are shown schematically principal components of a core manufacturing apparatus for winding a wire around the partially finished product to thereby obtain the electromagnetic coil.

Next, a description will be given of a manufacturing method for winding the wire 70 around the insulator 14 to thereby obtain the divided core 10. As shown in FIG. 3, a core manufacturing apparatus 80 includes a floating nozzle 82 through which the wire 70 is supplied. The floating nozzle 82 is capable of being displaced along a linear guide 84, and a nozzle portion 86 (wire supplying portion) through which the wire 70 is led out is capable of being swung about a swinging part 88 that is disposed in the vicinity of the linear guide 84. Stated otherwise, the nozzle portion 86 carries out a so-called swinging motion.

The core manufacturing apparatus 80 further includes a rotary support shaft 90. The insulator 14 in which the plurality of divided iron cores 12 are retained is supported by the rotary support shaft 90. Therefore, the insulator 14 is capable of being rotated together with the divided iron cores 12.

A method of manufacturing the divided core 10 according to the present embodiment is performed in the following manner, using the core manufacturing apparatus 80 which is configured as described above.

Figure 4:
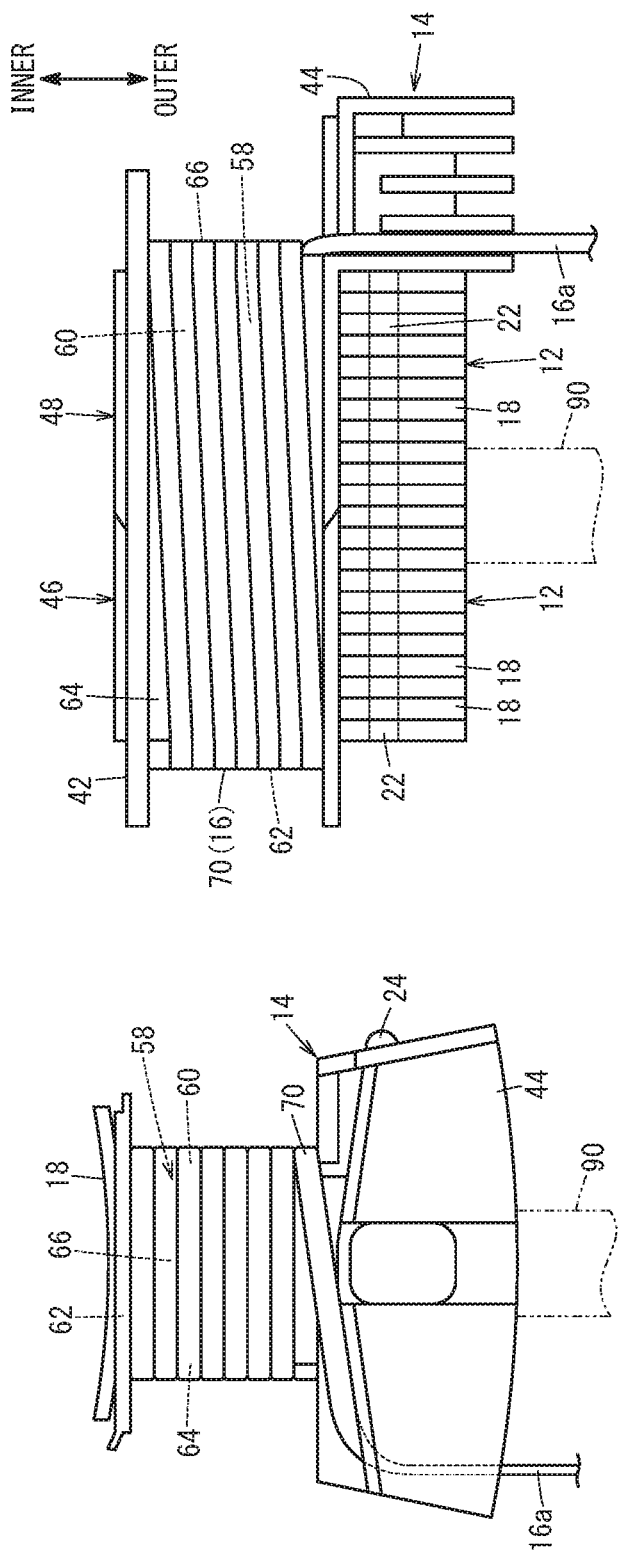
FIGS. 4A and 4B are a front view and a left side view, respectively, when a first layer is formed by winding the wire with respect to the partially finished product of FIG. 2.

A partially finished product P in which the divided iron cores 12 are sandwiched by the insulator 14 is held on the rotary support shaft 90, in a manner so that the lead wire accommodating section 44, and more specifically the outer diametrical side of the stator 40, is oriented downward. In this state, a winding process is performed. More specifically, the wire 70 (flat wire) is supplied from the nozzle portion 86, together with the rotary support shaft 90 being rotated in a clockwise direction. Along therewith, the partially finished product P is rotated integrally, whereby the wire 70 is wound around the winding member 58 of the insulator 14. As described above, the wire 70 is wound from the outer diametrical side toward the inner diametrical side of the winding member 58, and therefore, as shown in FIGS. 4A and 4B, the first layer is wound from a lower location toward an upper location. At this time, the nozzle portion 86 of the floating nozzle 82 and the wire 70 are substantially parallel (see FIG. 3).

In this instance, the wire 70 is passed through the lead wire accommodating section 44, and after having approached the front surface 66 of the winding member 58 that faces the lead wire accommodating section 44, the wire 70 is wound sequentially onto the right side surface 60, the surface (back surface 62) on the rear of the front surface 66, the left side surface 64, and the front surface 66 of FIG. 4A, in this order. More specifically, the wire 70 abuts against a first corner portion between the front surface 66 and the right side surface 60, a second corner portion between the right side surface 60 and the back surface 62, a third corner portion between the back surface 62 and the left side surface 64, and a fourth corner portion between the left side surface 64 and the front surface 66. Moreover, the first through fourth corner portions are formed as gently rounded portions.

In addition, when the wire 70 is wound onto the left side surface 64, as shown in FIG. 4B, the wire 70 is slightly skewed heading upwards. More specifically, a so-called lane change is performed with the left side surface 64 serving as a traverse surface, and the wire 70 moves toward the inner diametrical side. Therefore, a location is not formed where the wire 70 is overlapped on the first layer.

Figure 5:
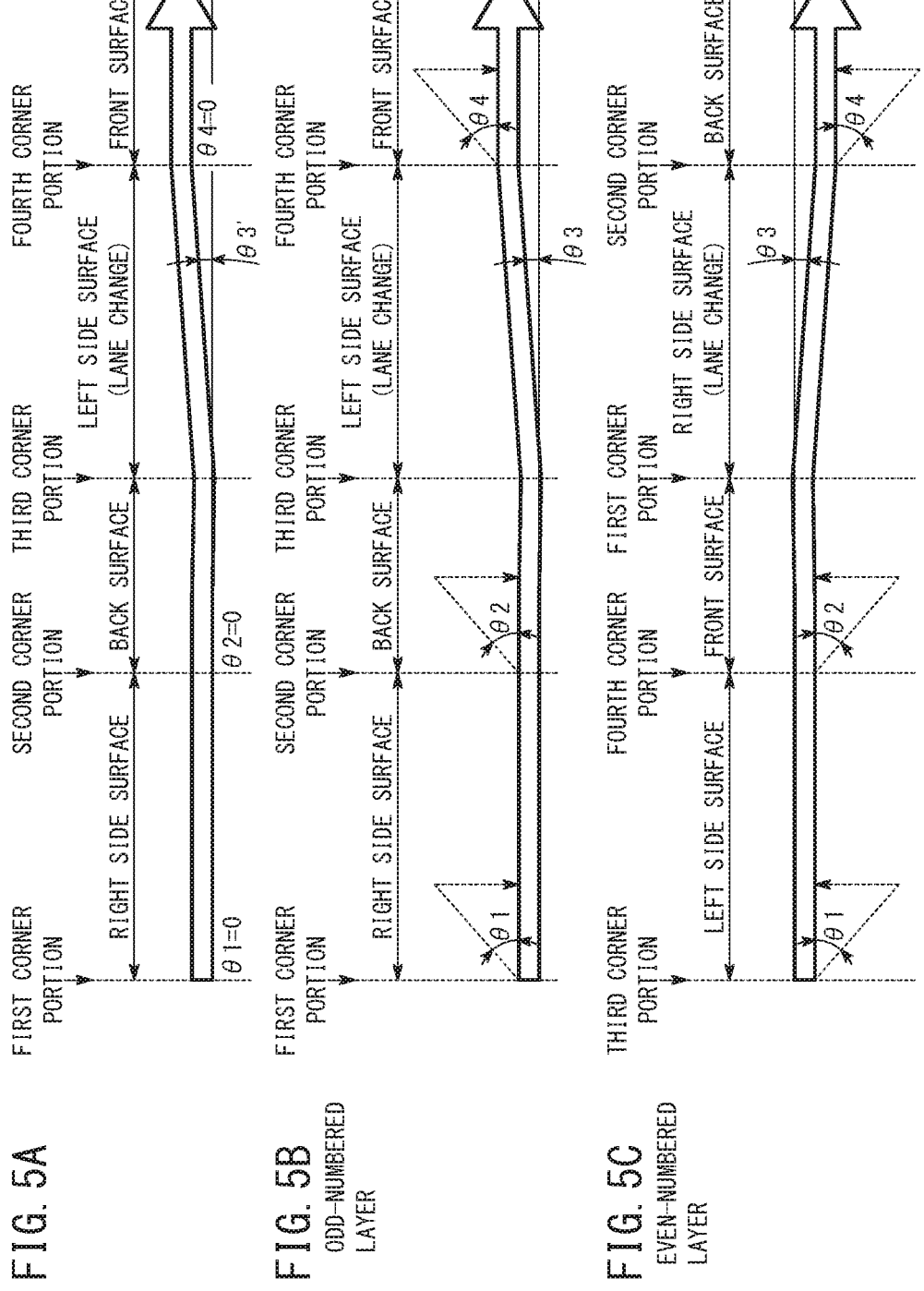
FIG. 5A shows a method of winding the wire according to a conventional technique.
FIGS. 5B and 5C show, respectively, a method of winding an odd numbered wire layer and a method of winding an even numbered wire layer, in a winding step of a method of manufacturing a divided core according to an embodiment of the present invention.

In the conventional technique, as shown in FIG. 5A, the nozzle portion 86 is displaced along the linear guide 84, in a manner so that the angle formed by the wire 70 and the nozzle portion 86 at the third corner portion becomes a predetermined angle $\theta 3'$. Consequently, the wire 70 becomes skewed at the angle $\theta 3'$ and a lane change is made. On the other hand, other than at the third corner portion, the nozzle portion 86 is not displaced. A similar process is carried out for the second and subsequent layers as well.

In contrast thereto, according to the present embodiment, at the time that the wire 70 is wound around each of the first through fourth corner portions, the floating nozzle 82 is displaced, or the nozzle portion 86 is subjected to swinging at all of the first through fourth corner portions, whereby predetermined angles $\theta 1$ to $\theta 4$ are formed between the nozzle portion 86 and the wire 70. Due to the formation of such angles, the wire 70 is placed in a state of temporarily overrunning the first through fourth corner portions. Thereafter, the nozzle portion 86 is displaced or swung in a manner so that the nozzle portion 86 and the wire 70 become parallel, whereupon rotation of the partially finished product P is continued. In FIG. 5B, the dashed lines indicate the period from the occurrence of overrunning until the parallel state is restored.

When the angles are formed, friction is generated between the first through fourth corner portions, and the locations of the wire 70 that are in contact with the first through fourth corner portions. Due to such friction, residual stress is applied to the wire 70. Since the winding direction and the overrun direction are brought forth in the manner described above, the residual stress is oriented in a diametrical outward direction of the stator 40.

Moreover, the angle θ3 of the third corner portion may be greater than or equal to the angle θ3' required for performing the lane change. When overrunning is made occur in excess of the angle θ3', the angle may then be returned to the angle θ3'. Further, the angles θ3 and θ4 preferably satisfy the inequality θ3<θ4.

After having wound the wire 70 up to the innermost diametrical location while repeating the lane change, winding of the second layer is performed. In this case, the second layer is wound from the inner diametrical side toward the outer diametrical side, and more specifically, from an upper location to a lower location in FIGS. 4A and 4B. Moreover, the direction of rotation of the partially finished product P is in a clockwise direction, in the same manner as when winding the first layer, and accordingly, the wire 70 is wound sequentially onto the left side surface 64, the front surface 66, the right side surface 60, and the back surface 62 of the winding member 58, in this order. However, with the second layer, the right side surface 60 serves as the traverse surface on which the lane change is made.

In this case as well, at the time that the wire 70 is wound around each of the first through fourth corner portions, the floating nozzle 82 is displaced, or the nozzle portion 86 is subjected to swinging at all of the first through fourth corner portions, whereby predetermined angles θ1 to θ4 are formed between the nozzle portion 86 and the wire 70. More specifically, the wire 70 is temporarily subjected to overrunning. Thereafter, the nozzle portion 86 is displaced or swung so as to become parallel to the wire 70. In FIG. 5C, the dashed lines indicate a period from the occurrence of overrunning until the parallel state is restored.

As a result, in the second layer as well, residual stress is applied to the wire 70. Since the winding direction and the overrun direction are brought forth in the manner described above, the residual stress is oriented in a diametrical outward direction of the stator 40, in the same manner as with the first layer.

Thereafter, from the third layer until the final layer, in odd-numbered layers, residual stress is applied to the wire 70 in conformity with that applied to the first layer, and in the even-numbered layers, residual stress is applied to the wire 70 in conformity with that applied to the second layer. Consequently, the electromagnetic coil 16 is formed to which there is applied an arbitrary residual stress toward the diametrical outward direction of the stator 40. In other words, the divided core 10 is obtained. Moreover, the frictional force between the wire 70 and the winding member 58, and the frictional force between the superimposed layers themselves are greater than the residual stress, and therefore, at the point in time that the residual stress is applied, the wire 70 (electromagnetic coil 16) does not undergo movement.

Figure 6:
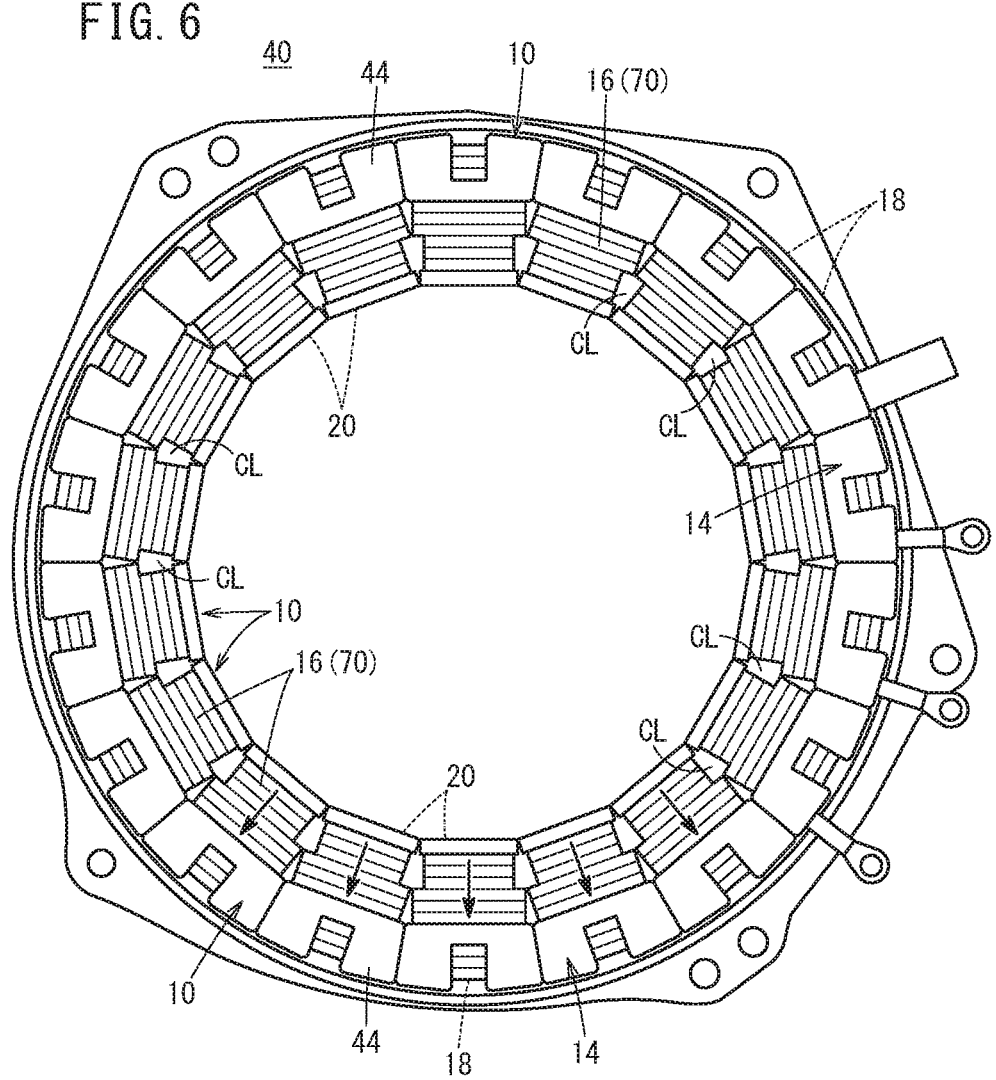
FIG. 6 is a schematic overall plan view of a stator obtained from the divided cores of FIG. 1.

In a similar manner, a required number of the divided cores 10 are manufactured, and the fitting projection 24 of one divided core 10 is fitted into the fitting recess 22 of another divided core 10. This process is repeated, and a delta connection is provided so as to form a U-phase, a V-phase, and a W-phase, and the stator 40 is constructed as shown in FIG. 6.

Next, a fusion bonding step is carried out. For this purpose, the respective electromagnetic coils 16 are energized, or in other words, a current is supplied to the electromagnetic coils 16. As a result, the electromagnetic coils 16 are heated, and due to such heating, the insulative coatings formed on the wires 70 are softened.

By softening the insulative coatings, the frictional force that acts between the respective layers decreases. In this instance, according to the present embodiment, an arbitrary residual stress in a diametrical outward direction of the stator 40 is imparted to the respective layers of the wire 70 that forms the electromagnetic coil 16. Therefore, the electromagnetic coils 16 move in the diametrical outward direction of the stator 40, as indicated by the arrows shown representatively on five of the electromagnetic coils 16 in FIG. 6. More specifically, according to the present embodiment, in which such an arbitrary residual stress is intentionally applied to the wire 70 when the wire 70 passes over the first through fourth corner portions, it is possible to avoid movement of the electromagnetic coil 16 in the diametrical inward direction of the stator 40.

Therefore, it is possible to make the clearance CL between the adjacent electromagnetic coils 16 as small as possible on the inner side in the diametrical direction of the stator 40. As described above, movement of the electromagnetic coil 16 in the diametrical inward direction of the stator 40 is avoided. Therefore, even in the case that the clearance CL is small, the electromagnetic coils 16 are prevented from contacting each other. Accordingly, the circumferential length of the stator 40 can be minimized, and ultimately, the stator 40, as well as the motor, can be reduced in size.

Additionally, in this case, there is no need to reduce the speed at which winding of the wire 70 is carried out. For this reason, since the winding efficiency of the wire 70 is ensured, it is also possible to avoid a decrease in the production efficiency of the divided cores 10, and hence, the stator 40 and the motor as well.

After a predetermined time has elapsed since supply of current with respect to the electromagnetic coils 16 is started, the supply of current is stopped. Consequently, the electromagnetic coils 16 undergo natural cooling, and the insulative coating of the wire 70 of the first layer, and the winding member 58 of the insulator 14 are fusion bonded, and together therewith, the insulative coatings of the wires 70 that form the respective layers are fusion bonded. As a result, the electromagnetic coils 16 are fixed to the winding members 58, and the layers from the first layer to the last layer are fixed together in an integral manner.

The present invention is not particularly limited to the above-described embodiment, and various modifications may be adopted therein without departing from the essence and gist of the present invention.

For example, the odd-numbered layers may be wound from the inner diametrical side toward the outer diametrical side, and the even-numbered layers may be wound from the outer diametrical side toward the inner diametrical side. In this case as well, a residual stress toward an outer side in the diametrical direction of the stator 40 may be imparted to the wire 70 that forms the respective layers.

In addition, the method of fusion bonding the insulative coating is not particularly limited to energizing or supplying current to the electromagnetic coils 16. For example, the divided cores 10 may be heated.

What is claimed is:

1. A method of manufacturing a divided core for a stator, the method comprising:

providing a winding member having a plurality of flat surfaces and a plurality of corner portions, each of the plurality of corner portions being individually interposed between adjacent flat surfaces among the plurality of flat surfaces, wherein the winding member further comprises an insulator portion positioned adjacent to an iron core, and wherein the winding member is of a substantially polygonal shape;

forming a coil by winding a wire around the winding member and adjacent to the insulator portion, thereby shaping the coil into the substantially polygonal shape of the winding member; and fusion bonding an insulative coating of the wire to thereby obtain the divided core for the stator, wherein the forming the coil further comprises supplying the wire from a wire supply unit, and imparting a residual stress to the wire toward an outer side in the diametrical direction of the stator by inclining the wire at a predetermined angle between the wire supply unit and the winding member while winding the wire around the plurality of corner portions of the winding member.

2. The method of manufacturing the divided core for the stator according to claim 1, wherein the wire is a flat wire having a belt-shape.

3. The method of manufacturing the divided core for the stator according to claim 1, wherein the corner portion is a rounded portion.

4. The method of manufacturing the divided core for the stator according to claim 1, wherein the substantially polygonal shape is a quadrilateral shape.

5. The method of manufacturing the divided core for the stator according to claim 1, wherein the inclining the wire at the predetermined angle further comprises forming a layer of the coil by winding the wire around a first flat surface from the plurality of flat surfaces at a first winding angle and winding the wire around a second flat surface from the plurality of surfaces at the predetermined angle, wherein the predetermined angle is inclined with respect to the first winding angle while forming the layer.

6. The method of manufacturing the divided core for the stator according to claim 5, wherein the imparting the residual stress to the wire further comprises declining the wire at the predetermined angle between the wire supply unit and the winding member while winding the wire around the plurality of corner portions of the winding member.

7. The method of manufacturing the divided core for the stator according to claim 6, wherein the declining the wire at the predetermined angle further comprises forming a second layer of the coil by winding the wire around the first flat surface at the predetermined angle and winding the wire around the second flat surface at the first winding angle, wherein the predetermined angle is declined with respect to the first winding angle while forming the second layer.

* * * * *